Figure 7:
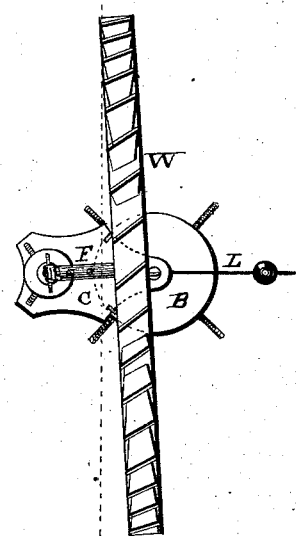

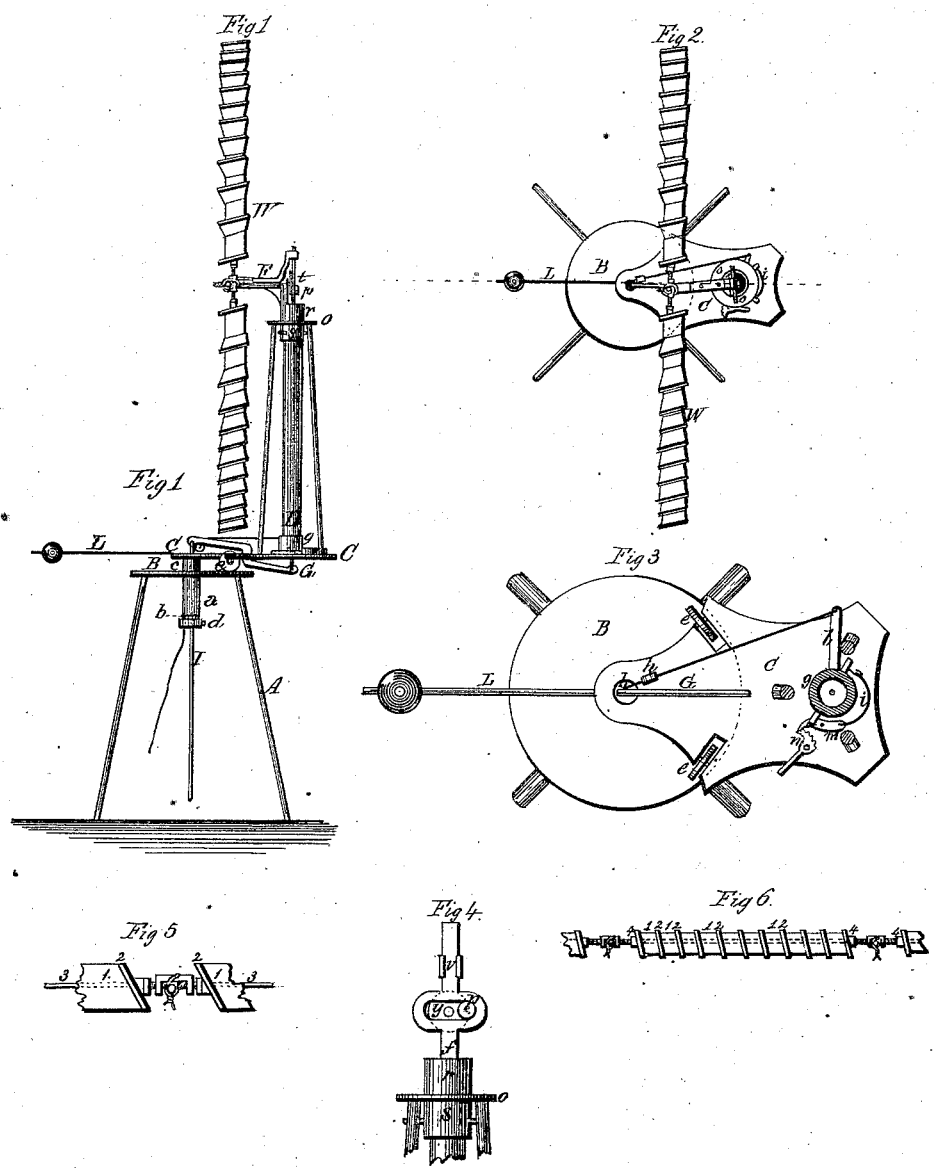
P. SHECKLER & H. W. BOLENDER.
Windmill.
No. 160,620. Patented March 9, 1875.

2 Sheets--Sheet 2.

P. SHECKLER & H. W. BOLENDER.
Windmill.

No. 160,620. Patented March 9, 1875.

WITNESSES
INVENTORS

UNITED STATES PATENT OFFICE.

PETER SHECKLER AND HARRISON W. BOLENDER, OF ORANGEVILLE, ILL.

IMPROVEMENT IN WINDMILLS.

Specification forming part of Letters Patent No. 160,620, dated March 9, 1875; application filed February 4, 1875.

*To all whom it may concern:*

Be it known that we, PETER SHECKLER and HARRISON W. BOLENDER, of Orangeville, in the county of Stephenson and State of Illinois, have invented certain new and useful Improvements in Windmills; and we do hereby declare the following to be a full, clear, and exact description of the invention, such as will enable others skilled in the art to which it pertains to make and use it, reference being had to the accompanying drawings, which form part of this specification.

Our invention relates to an improvement in windmills; and consists in a self-regulating solid wheel made in sections, and which is supported upon a turn-table rotating around the center of a platform on top of a suitable frame or derrick. It also consists in the arrangement and combination of parts, that will be more fully described hereafter.

The accompanying drawing represents our invention.

A represents a derrick, on the top of which is a platform, B, and under the center of this platform is formed a sleeve, $a$, through which passes the tube $b$, which tube is upheld by the collar $c$ around its upper end, and prevented from being drawn out by another collar, $d$, around its lower end. To the collar $c$ is fastened the turn-table C, under which, so as to run near the edge of the platform B, are placed rollers $e$, which support the turn-table C, and facilitate its being turned around. Upon this turn-table, at a point farthest from the center, around which it moves, is a cylinder, D, placed vertically over an opening in the turn-table. Around and to the lower end of this cylinder is fastened a collar, $g$, from the side of which projects an arm, $l$, so that by means of a cord attached to the end of this arm, and passed over the pulley $h$ near the upper end of the tube $b$, and down through that tube, the cylinder D may be partly turned around, carrying the wheel with it. On the opposite side of the arm $l$, but secured to the turn-table C, is the spring $i$, which returns the cylinder D to its former position when it has been turned by means of the cord or otherwise. The lever $m$ bears upon the spring, and is acted upon by the ratcheted lever $n$, so that the power of the spring may be increased or diminished, as the case may be. The cylinder D is supported by suitable braces attached to a collar, $o$, in which it turns, and is held in position by two other collars, $r$ $s$, fastened to the cylinder—the one, $r$, above, and the other, $s$, below, the collar $o$—the collar $s$ having stops to prevent the cylinder from being turned too far. Upon the rear side of the collar $r$ is a vertical projection, to which is secured a sleeve or box, F, extending backward at a right angle. Through this sleeve passes a shaft having on one end the wheel W, and on the other a crank, $t$, provided with an anti-friction roller, $p$. The crank operates in a sash, $y$, of which the upper end moves in a slide, $v$, to prevent lateral motion. To the lower end of this sash is attached a rod, $f$, which extends downward in the cylinder D, and through the opening under it, and is there connected to the end of a walking-beam, G, which beam is pivoted to the under side of the turn-table C, whence it passes upward through the turn-table, extending to the mouth of the tube $b$, where it is attached to the pump-rod I. To counterbalance the weight placed upon one end of the turn-table a weighted rod, L, is applied to the other, which acts as a counterpoise. Blocks 1, of the proper shape, and slats 2, to fit in between them, are bored obliquely, rods 3 passed through them, and drawn together by nuts 4, to form sections of the wheel, after which the sections are joined by right-and-left-hand screws. The shaft to which the wheel is attached is slightly turned to one side, so as not to be perpendicularly over the platform B.

The effect of a wind which is strong enough to overcome the resistance of the spring would be, that the wheel turns edgewise to the wind, and then, acting as a vane, the wheel follows every shifting of the wind, and when the wind abates, so that the spring may act again, the wheel is turned around (back) to face the wind by the spring $i$.

Having thus described our invention, we claim—

1. The turn-table C, pivoted in the center of platform B, and supported by rollers $e$, in combination with the weight or counter-balance L, substantially as shown.

2. The combination of the spring $i$, lever $m$, and the ratcheted lever n with the cylinder D and wheel W, substantially as described.

3. The combination of the slats 2, blocks 1, rods 3, having right-and-left-handed screws and nuts, substantially as shown.

4. In a wind-wheel without a vane, the wheel W, placed at an angle, so that it will never squarely face the wind, in combination with a spring or weight for returning it to position after having been turned sidewise by the wind, substantially as shown.

5. In a windmill, the combination of a derrick or supporting-frame and a turn-table having a cylinder that supports the wheel placed out beyond the edge of the derrick, whereby the wheel is made to revolve over the center of the derrick, substantially as shown.

6. The turn-table C, revolving around the center of the derrick, in combination with the cylinder D, provided with stops s, arm l, with a cord, substantially as described.

In testimony that we claim the foregoing we have hereunto set our hands this 15th day of January, 1875.

PETER SHECKLER.
HARRISON W. BOLENDER.

Witnesses:
WILLIAM SANDOE,
SAMUEL WISE.